(12) United States Patent
Hwang

(10) Patent No.: US 8,248,452 B2
(45) Date of Patent: Aug. 21, 2012

(54) COMMUNICATION METHOD AND NETWORK DISPLAY APPARATUS USING THE SAME

(75) Inventor: Soon-hoon Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1299 days.

(21) Appl. No.: 11/948,095

(22) Filed: Nov. 30, 2007

(65) Prior Publication Data

US 2008/0246832 A1    Oct. 9, 2008

(30) Foreign Application Priority Data

Apr. 4, 2007  (KR) ........................ 10-2007-0033298

(51) Int. Cl.
*H04N 7/14* (2006.01)
(52) U.S. Cl. .................................. 348/14.07; 348/14.13
(58) Field of Classification Search .............. 348/14.01, 348/14.02, 14.03, 14.07, 2.1, E7.077, E7.081, 348/14.04, 14.05, 14.06, 14.13; 379/201.01, 379/202.01
See application file for complete search history.

(56) References Cited

U.S. PATENT DOCUMENTS
2002/0164155 A1    11/2002  Mate
2004/0194145 A1*   9/2004  Douillet et al. ............... 725/110

FOREIGN PATENT DOCUMENTS
CN          1491039 A       4/2004

OTHER PUBLICATIONS

Wei, Ai, Translation of Chinese Patent Publication CN 1491039, Published Apr. 21, 2004.*
First Office Action issued Aug. 17, 2011 by the State Intellectual Property Office of P.R. China in counterpart Chinese Patent Application No. 200810004581.0.

* cited by examiner

*Primary Examiner* — Brian Ensey
(74) *Attorney, Agent, or Firm* — Sughrue Mion, PLLC

(57) ABSTRACT

A network display apparatus, which is connected to a network and has a thin client function, is used as a monitor of a host device. If audio and video data is received through the network while the network display apparatus is used as a monitor of the host device, the network display apparatus may transmit the audio and video data to the host device. The host device performs signal processing for the audio and video data received through the network from the network display apparatus, and outputs the processed data. Accordingly, the audio and video data received from an external apparatus through the network by the network display apparatus is output by the host device, and thus it is possible to perform operations using the host device and simultaneously to provide a user of the audio and video data received from the external apparatus without source change.

15 Claims, 5 Drawing Sheets

COMMUNICATION METHOD AND NETWORK DISPLAY APPARATUS USING THE SAME

CROSS-REFERENCE TO RELATED APPLICATIONS

This application claims priority from Korean Patent Application No. 10-2007-0033298, filed on Apr. 4, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to a communication method and a network display apparatus using the same, and more particularly, to a communication method which provides a user with video, audio and event data, which are received from an external apparatus via a network by a network display apparatus having a thin client function.

2. Description of the Related Art

A thin client is a client which is configured in the simplest manner and in which all information and functions depend primarily on a server in a server-thin client system. In thin client technologies, software applications are executed in servers, hardware and software of clients have the most simplified structure, and information is not stored in clients. Thus, thin client technologies provide benefits such as a reduction in client price and maintenance costs, and ease of data backup.

FIG. 1 is a view schematically illustrating a host device which is connected to a conventional network display apparatus.

In FIG. 1, a network display apparatus 10 having a thin client function is connected to a personal computer (PC) 100 that is contained in a host device, and the network display apparatus 10 and PC 100 are connected to each network.

The network display apparatus 10 having a thin client function comprises a central processing unit (CPU), so the network display apparatus 10 can be operated independently. The network display apparatus 10 having a thin client function includes, for example, a monitor or digital television (DTV). The network display apparatus 10 provides an Internet protocol (IP)-based video telephony function which enables voice telephony while viewing video through a network, and is used as a monitor of the PC 100.

When the network display apparatus 10 is used as a monitor of the PC 100 software which provides the IP-based video telephony function is activated. For example, the software which provides the IP-based video telephony function is activated even if a user performs operations such as word processing or web surfing using the PC 100.

If a call is received through a network when the network display apparatus 10 is used as a monitor of the PC 100, the CPU of the network display apparatus 10 may display an on-screen display (OSD) shown in FIG. 2.

The OSD shown in FIG. 2 comprises selection items "Source change" and "Ignore", together with a message stating that "Incoming telephone call". "Source change" may be selected to input a command to change a source from the PC 100 to the network display apparatus 10 in order to answer the received call. "Ignore" may be selected to input a command to reject the received call.

In this situation, if a user checks the displayed OSD and selects "Source change" from the OSD in order to answer the received call while the user is performing other tasks using the PC 100, the main performer may be changed from the PC 100 to the network display apparatus 10. Accordingly, it is impossible to simultaneously perform tasks using the PC 100 and the telephony function provided by the network display apparatus 10.

Therefore, the main performer is changed from the PC 100 to the network display apparatus 10 in order to answer the telephone call, so operations performed using the PC 100 are discontinued, causing inconvenience to the user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, the present invention provides a communication method and a network display apparatus using the same, in which a user can perform operations using a host device while answering an Internet protocol (IP)-based video telephone call.

The present invention also provides a communication method and a network display apparatus using the same, in which audio and video data transmitted from an external apparatus is received by the network display apparatus using a host device, so that a user can answer an IP-based video telephone call while performing operations using the host device, without a source change.

According to an aspect of the present invention, there is provided a communication method of a network display apparatus, the method comprising displaying video received from a first external apparatus; and transmitting data received from a second external apparatus via a network, to the first external apparatus.

Transmitting of data received from the second external apparatus may comprise transmitting the received data to the first external apparatus, if the data received from the second external apparatus includes a request to perform video processing.

The method may further comprise receiving the video processed by the first external apparatus and displaying the received video.

The processed video may be displayed as picture-in-picture (PIP) video on a video displayed by the first external apparatus.

Transmitting of data received from the second external apparatus may comprise, if a request to perform video processing is received from the second external apparatus, transmitting to the first external apparatus an event to inform that the request to perform video processing has been received, receiving a message asking whether to accept the request to perform video processing, and displaying the received message, wherein the message is generated by the first external apparatus; and transmitting the request to perform video processing to the second external apparatus, if it is determined that the request to perform video processing through the displayed message is accepted.

Transmitting of data received from the second external apparatus may comprise, transmitting the received request to perform video processing to the first external apparatus, if a request to perform video processing is received from the second external apparatus while the video received from the first external apparatus is being displayed.

The first external apparatus may comprise a host device which performs video processing for data received from the network display apparatus and outputs the processed video. The second external apparatus may comprise a server.

According to another aspect of the present invention, there is provided a network display apparatus comprising a display which displays video received from a first external apparatus; and a controller which transmits data received from a second external apparatus via a network, to the first external apparatus for processing.

If the data received from the second external apparatus comprises a request to perform video processing, the controller may transmit the received data to the first external apparatus to perform video processing.

The controller may receive the video processed by the first external apparatus and display the received video on the display.

The processed video may be displayed as picture-in-picture (PIP) video on a video displayed by the first external apparatus.

If a request to perform video processing is received from the second external apparatus, the controller may transmit to the first external apparatus an event to inform that the request to perform video processing has been received, receive a message asking whether to accept the request to perform video processing, and display the received message on the display. The message may be generated by the first external apparatus. The controller may transmit the request to perform video processing to the second external apparatus if it is determined that the request to perform video processing through the displayed message is accepted.

The controller may transmit the received request to perform video processing to the first external apparatus, if a request to perform video processing is received from the second external apparatus while the video received from the first external apparatus is being displayed.

The first external apparatus may comprise a host device which performs video processing for data received from the network display apparatus and outputs the processed video. The second external apparatus may comprise a server.

According to another aspect of the present invention, there is provided a host device comprising a signal processor which performs video processing for data received through a network from a network display apparatus; and a controller which: generates a message asking whether to accept the data and displays the message on the network display apparatus, if an event to inform the controller that the data has been received from the network display apparatus through the network is received; controls the signal processor to perform video processing for the data received from the network display apparatus, if an accept command is input through the displayed message; and displays the processed video on the network display apparatus.

The controller may control the signal processor to perform video processing for the received data and to display the processed video as picture-in-picture (PIP) video on a the video displayed on the network display apparatus.

According to another aspect of the present invention, there is provided a network display system comprising a network display apparatus, which is connected to a network and has a thin client function; and a host device connected to the network display apparatus. The network display system may comprise a network display apparatus which displays video received from the host device and transmits data received through the network to the host device; and a host device which performs video processing for the data received from the network display apparatus, and displays the processed video as picture-in-picture (PIP) video in the video displayed on the network display apparatus.

The network display apparatus may transmit to the host device an event to inform that the request to perform video processing has been received, if the data received through the network comprises a request to perform video processing while the video received from the host device is displayed.

The host device may generate a message asking whether to accept the request and display the message on the network display apparatus, if the event to inform that the request to perform video processing has been received is received from the network display apparatus through the network. The host device may perform video processing for the data received from the network display apparatus, if a command to accept the request is received in response to the displayed message.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
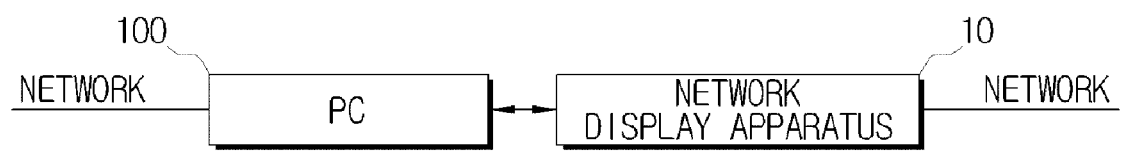
FIG. 1 is a view showing a host device which is connected to a conventional network display apparatus.
Figure 2:
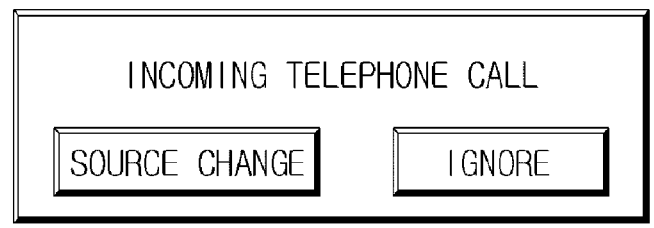
FIG. 2 is a view schematically illustrating an on-screen display (OSD) for performing communication in a conventional art.

Certain exemplary embodiments of the present invention will now be described in greater detail with reference to the accompanying drawings.

In the drawings, the same elements are denoted by the same reference numerals throughout the drawings. The matters defined in the description, such as detailed construction and elements, are provided to assist in a comprehensive understanding of the invention. Thus, it is apparent that the exemplary embodiments of the present invention can be carried out without those specifically defined matters. Also, detailed descriptions of known functions and configurations incorporated herein have been omitted for conciseness and clarity.

Figure 3:
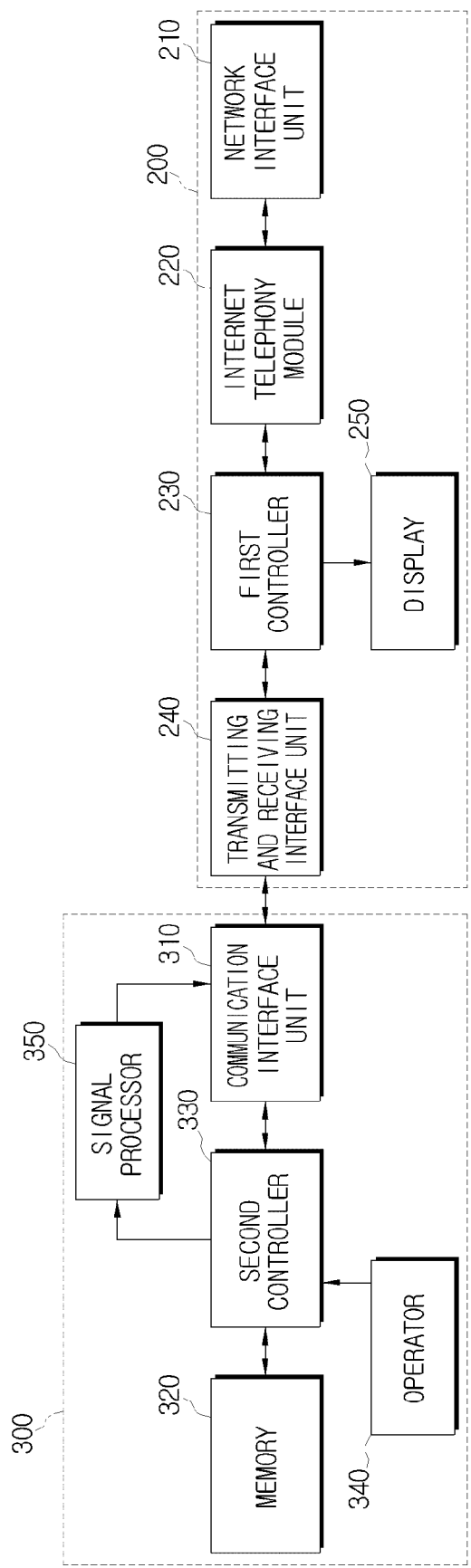
FIG. 3 is a view schematically illustrating a host device which is connected to a network display apparatus according to an exemplary embodiment of the present invention.

FIG. 3 is a view schematically illustrating a host device which is connected to a network display apparatus according to an exemplary embodiment of the present invention.

A network display apparatus 200 according to an exemplary embodiment of the present invention transmits event, audio and video data received from an external apparatus to a host device 300 which functions as a main performer, using an application. The host device 300 receives the event, audio and video data transmitted from the network display apparatus 200 using the application, and then outputs event, audio and video, which corresponds to the event, audio and video data transmitted from the network display apparatus 200, through the network display apparatus 200. Accordingly, the network display apparatus 200 may be used as a monitor of the host device 300, and at the same time Internet protocol (IP)-based picture communication can also be performed.

Referring to FIG. 3, the network display apparatus 200 comprises a network interface unit 210, an Internet telephony module 220, a first controller 230, a transmitting and receiving interface unit 240 and a display 250.

The network interface unit 210 provides an interface to transmit and receive audio and video data via a network. Specifically, the network interface unit 210 receives audio and video data from a server via the network, and transmits the audio and video data received from the host device 300 to the server.

The Internet telephony module 220 comprises an application (hereinafter, referred to as the "Internet telephony application") which has an IP-based video telephony function which enables video telephoning to be performed via a network.

The Internet telephony application is an actual application which provides the IP-based video telephony function, and refers to an application which provides the IP-based video telephony function and transmits the audio and video data received over the network to the host device 300.

Specifically, if a telephone call is received through the network, the Internet telephony application may allow event data, which provides notification of an incoming telephone call, to be transmitted to the host device 300. Additionally, if a response to a request for answering the call is received from the host device 300, the Internet telephony application may allow audio and video data received through the network to be transmitted to the host device 300. Here, the audio and video data is data that may be subjected to signal processing in order to output audio and video corresponding to the audio and video data.

The first controller 230 executes the Internet telephony application. Even if the network display apparatus 200 is used as a monitor of the host device 300, the first controller 230 continues to run the Internet telephony application. Additionally, the first controller 230 performs operations corresponding to the launching of the Internet telephony application.

The transmitting and receiving interface unit 240 provides an interface to transmit and receive data to and from the host device 300. The transmitting and receiving interface unit 240 transmits the event data to the host device 300, receives a response regarding whether or not to answer the call from the host device 300, and also transmits the audio and video data received via the network to the host device 300.

The display 250 displays audio and video according to the operations performed by the host device 300.

Although the network display apparatus 200 comprises the Internet telephony module 220, and the Internet telephony module 220 comprises the Internet telephony application as described above, the exemplary embodiment of the present invention is not limited to such a configuration. Accordingly, the Internet telephony application may be stored in a storage medium, instead of the Internet telephony module 220, and the first controller 230 may launch the stored Internet telephony application, which can provide functions of the Internet telephony module. The storage medium being, for example, a computer-readable medium.

The host device 300 comprises a communication interface unit 310, a memory 320, a second controller 330, an operator 340 and a signal processor 350.

The communication interface unit 310 provides an interface to perform data communication with the network display apparatus 200. The communication interface unit 310 receives the event data, which provides notification of an incoming telephone call, from the network display apparatus 200, and transmits a response regarding whether or not to answer the call to the network display apparatus 200. Additionally, the communication interface unit 310 receives the audio and video data from the network display apparatus 200.

The memory 320 stores an agent application. When a telephone call is received through the network, the agent application enables the call to be answered in the host device 300. In other words, if data to be subjected to the signal processing is received from the external apparatus, the agent application may allow the host device 300 to process the data and output the processed data, without the need to change the main performer from the host device 300 to the network display apparatus 200 in order to output the data.

Specifically, if the event data is received from the network display apparatus 200, the agent application may generate an on-screen display (OSD) to provide notification of an incoming telephone call and may allow the generated OSD to be displayed on the display 250. If a user selects whether or not to answer the call using the displayed OSD, the agent application may enable the user's response to be transmitted to the network display apparatus 200.

Additionally, the agent application enables the audio data received from the network display apparatus 200 to be processed and output through a speaker. The agent application enables the video data received from the network display apparatus 200 to be subjected to signal processing, and allows video corresponding to the processed data to be output as a picture-in-picture (PIP) screen. At this time, the speaker may be separated from the network display apparatus 200, or may be integrally formed on the network display apparatus 200.

The agent application also enables audio data input through a microphone and video data captured by a photographing apparatus to be transmitted to a server through the network display apparatus 200. The microphone and photographing apparatus may be separated from the network display apparatus 200, or may be integrally formed with the network display apparatus 200.

Furthermore, the agent application allows data representing a screen currently displayed in response to a user command to be transmitted to the server through the network display apparatus 200. For example, presentation data currently gathered may be transmitted using the agent application.

The second controller 330 launches the agent application stored in the memory 320. If the event data is received from the network display apparatus 200, the second controller 330 may execute the agent application. Additionally, the second controller 330 performs operations corresponding to the launch of the agent application.

The operator 340 is a means by which a user may input a command, and may comprise a keyboard, a mouse, or the like. Specifically, the operator 340 is used to select whether or not to answer the call using the displayed OSD by moving a cursor.

The signal processor 350 performs a predetermined signal processing for the audio data received from the network display apparatus 200, and outputs the processed data through the speaker. The signal processor 350 also performs a predetermined signal processing for the video data received from the network display apparatus 200, and displays the processed data as a PIP screen on the currently displayed screen.

Additionally, the signal processor 350 processes the audio data input through the microphone and the video data captured by the photographing apparatus, and outputs the processed data, so that the data may be transmitted. The signal processor 350 also processes data representing the currently displayed screen, and outputs the processed data, so that the data may be transmitted.

The host device 300 may be connected to the network through the network display apparatus 200, although the host device 300 is directly connected to the network.

The functions of the signal processor 350 described above are performed by launching the agent application, but can be performed using the agent application even if the host device 300 does not comprise the signal processor 350.

Figure 4:
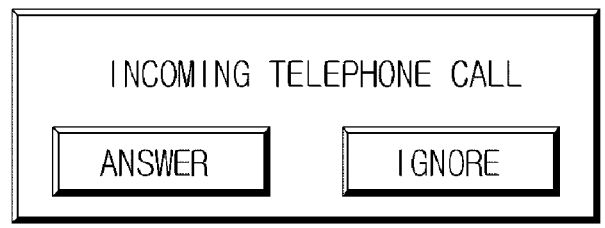
FIG. 4 is a view showing an OSD for performing communication according to an exemplary embodiment of the present invention.

FIG. 4 is a view showing an OSD for performing communication according to an exemplary embodiment of the present invention.

In FIG. 4, the OSD to give notification of an incoming telephone call is shown. The OSD comprises a message stating that "Incoming telephone call", together with selectable items such as "Answer" or "Ignore" to select whether or not to answer the call.

"Answer" may be selected to input a command to answer the received call, and "Ignore" may be selected to input a command to reject the received call. Accordingly, if a user selects "Answer", it is possible to answer the received call in the host device 300 as a main performer, without the need to select "Source change" and change the source in order to answer the call in the conventional art.

In this situation, the telephone call may be answered using the host device 300 as a main performer, but the host device 300 may not function as a telephone. In other words, the network display apparatus 200 provides the telephony function. However, the network display apparatus 200 shows the display screen of the host device 300, so it is impossible to process and output the audio and video data received for conversation by telephone. Accordingly, the host device 300, instead of the network display apparatus 200, may be used to perform the signal processing and outputting, and thus the telephone call may be received in the host device 300.

Figure 5:
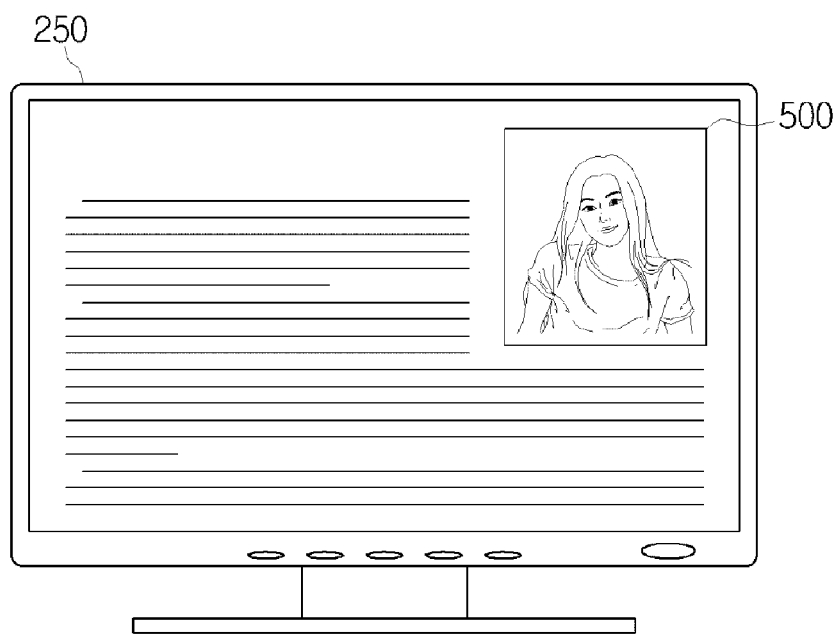
FIG. 5 is a view showing a screen while communication is performed, according to an exemplary embodiment of the present invention.

FIG. 5 is a view showing a screen while communication is being performed, according to an exemplary embodiment of the present invention.

In FIG. 5, a currently displayed screen and a PIP screen 500 are displayed on the display 250 of the network display apparatus 200.

If "Answer" is selected by the operator 340 using the OSD to provide notification of an incoming telephone call as shown in FIG. 4 when the network display apparatus 200 is used as a monitor of the host device 300, the agent application may allow a response to a request for answering the call to be transmitted to the network display apparatus 200.

The internet telephony application of the network display apparatus 200, which receives the response to request for answering the call from the host device 300, may then allow the audio and video data received through the network to be transmitted to the host device 300.

Additionally, the agent application enables video corresponding to the received video data to be displayed as the PIP screen 500 on the currently displayed screen.

Accordingly, a user can answer the telephone call while continuing to perform other tasks currently being conducted.

Figure 6:
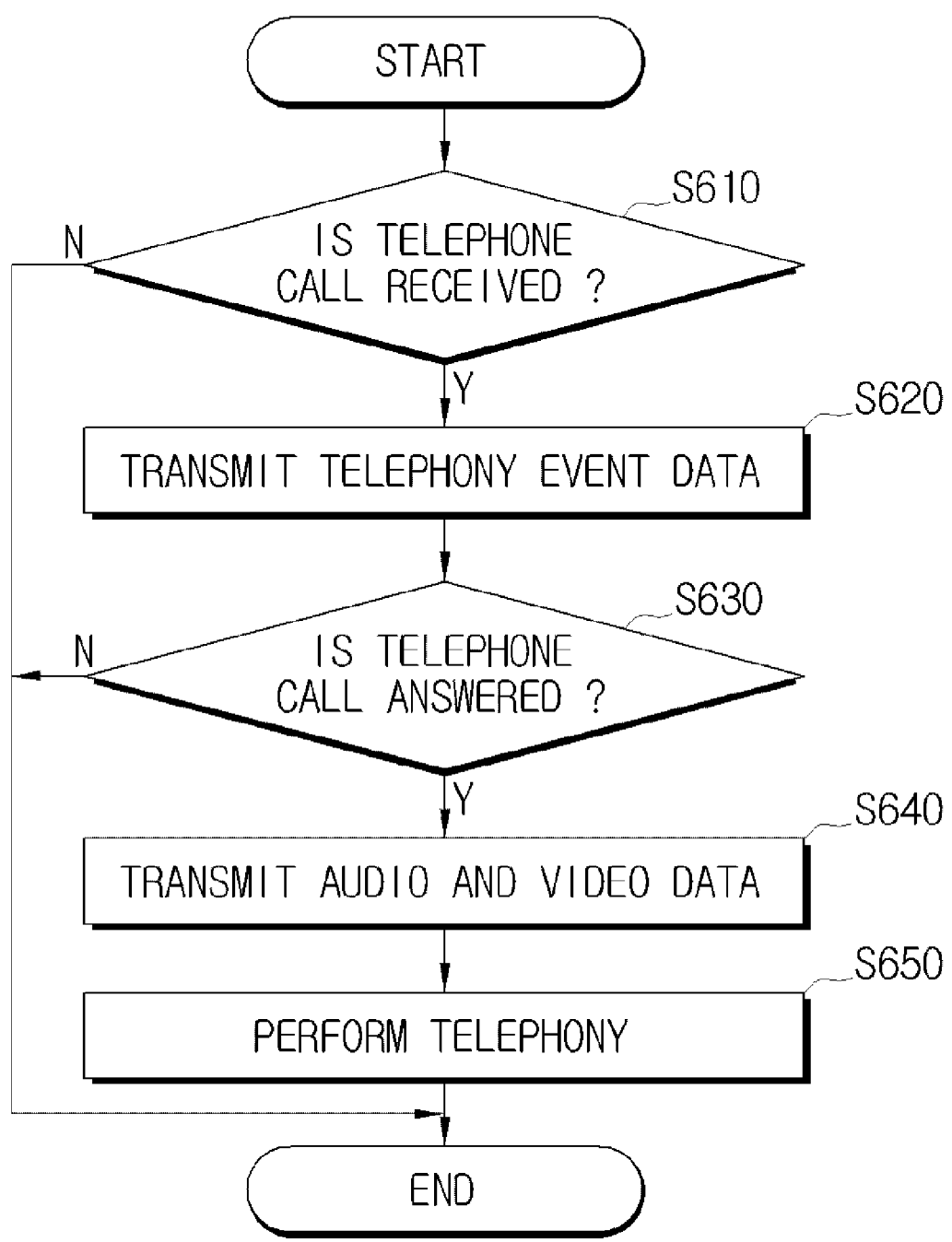
FIG. 6 is a flowchart illustrating a communication method of a network display apparatus for performing communication with a host device, according to an exemplary embodiment of the present invention.

FIG. 6 is a flowchart explaining a communication method of a network display apparatus for performing communication with a host device, according to an exemplary embodiment of the present invention.

In FIG. 6, the Internet telephony application determines whether a call signal is received through the network (S610). That is, the Internet telephony application determines whether a telephone call is received via the network.

If it is determined that the call signal is received (S610-Y), the Internet telephony application may transmit telephony event data to the host device 300 (S620). The telephony event data is an event to inform a user of an incoming telephone call.

Next, the Internet telephony application may determine whether to answer the telephone call (S630). If an answering response for the telephony event is received from the host device 300, the Internet telephony application may answer the call, and if an ignoring response for the telephony event is received from the host device 300, the Internet telephony application may reject the call.

If it is determined to reject the call (S630-Y), the Internet telephony application may transmit to the host device 300 the audio and video data received via the network (S640). In this situation, the Internet telephony application may transmit the response to the request for answering the call to the server through the network. Additionally, the Internet telephony application may receive audio and video data from the server through the network.

The Internet telephony application may transmit the audio and video data received from the host device 300 to the server over the network, so that telephony may be performed (S650).

Figure 7:
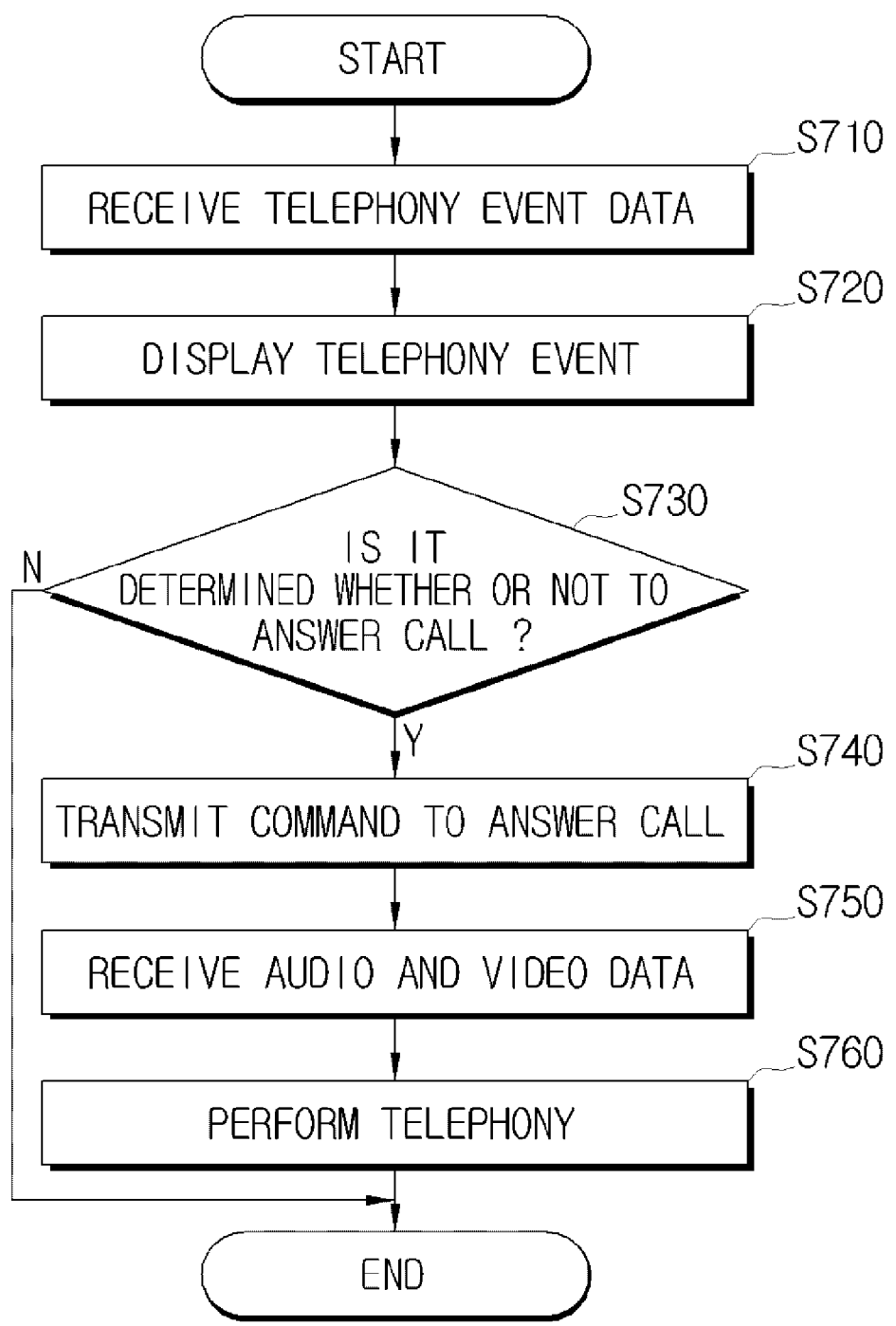
FIG. 7 is a flowchart illustrating a communication method of a host device for performing communication with a network display apparatus, according to an exemplary embodiment of the present invention.

FIG. 7 is a flowchart explaining a communication method of a host device for performing communication with a network display apparatus, according to an exemplary embodiment of the present invention.

In FIG. 7, the second controller 330 receives the telephony event data from the network display apparatus 200 through the communication interface unit 310 (S710). If the telephony event data is received, the second controller 330 may launch the agent application stored in the memory 320.

The agent application may display the OSD to give notification of the incoming telephone call on the display 250, in response to the received telephony event data (S720).

The agent application may determine whether or not to answer the call (S730).

If a user inputs a command to answer the call by selecting "Answer" on the displayed OSD, the agent application may determine that the user wishes to answer the call.

If it is determined to answer the call (S730-Y), the agent application may transmit a response to the command to answer the call to the network display apparatus 200 (S740).

The agent application may then receive the audio and video data from the network display apparatus 200 through the communication interface unit 310 (S750).

The agent application enables the received audio data to be output through the speaker and the received video to be displayed as a PIP screen on the display 250. Additionally, the agent application allows the audio data input through the microphone and the video data captured by the photographing apparatus to be output to the server through the network, so that the audio and video data may be transmitted to the network display apparatus 200, to thus perform telephony (S760).

As described above, if an Internet telephone call is received during performance of other tasks using the host device 300, the telephone call may be answered without the need to change the main performer to the network display apparatus 200 comprising the Internet telephony module.

Additionally, the exemplary embodiment of the present invention provides that if a telephone call is received via a network, the network display apparatus 200 may transmit to the host device 300 the audio and video data received from the server through the network, but the present invention is not limited to the configuration described above.

For example, if video mail or a moving picture file are transmitted from the server via the network, the network display apparatus 200 may also receive the video mail or the moving picture file and transmit the video mail or the moving picture file to the host device 300, and the host device 300 may perform a predetermined signal processing for the video mail and the moving picture file and output the processed video mail and the processed moving picture file on the network display apparatus 200.

Alternatively, the network display apparatus 200 may receive audio and video data from an external apparatus connected to the network display apparatus 200, and may transmit the received data to the host device 300. The host device 300 may then perform a predetermined signal processing for the received data and may output the processed data on the network display apparatus 200.

Accordingly, if data is received from an external apparatus through the network display apparatus 200 while other tasks are being performed using the host device 300, the data received through the host device 300 may be output so as to be viewed by a user, without changing the main performer to the network display apparatus 200.

According to the exemplary embodiment of the present invention as described above, audio and video data transmitted from an external apparatus using an application executed by a thin client may be received using an application executed by a host device, so it is possible to receive an IP-based video telephone call while other tasks are being performed using the host device without source change.

Therefore, the IP-based video telephone call may be received while tasks are being performed using the host device, thereby increasing efficiency and user convenience.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A communication method of a network display apparatus, the method comprising:
   displaying video received from a first external apparatus; and
   transmitting data received through a network from a second external apparatus, to the first external apparatus,
   wherein the data received from the second external apparatus includes a second video, the first external apparatus processes a first video of the first external apparatus and the second video data as a picture-in-picture (PIP) video to be transmitted to the network display apparatus, and the network display apparatus receives and displays the PIP video.

2. The method as claimed in claim 1, wherein the transmitting of the data received through the network from the second external apparatus comprises transmitting the received data to the first external apparatus if the data received from the second external apparatus includes a request to perform video processing.

3. A communication method of a network display apparatus, the method comprising:
   displaying video received from a first external apparatus; and
   transmitting data received through a network from a second external apparatus, to the first external apparatus,
   wherein the transmitting of the data received through the network from the second external apparatus comprises transmitting the received data to the first external apparatus if the data received from the second external apparatus includes a request to perform video processing,
   wherein the transmitting of the data received through the network from the second external apparatus comprises:
   if the request to perform video processing is received from the second external apparatus, transmitting to the first external apparatus an event indicating that the request to perform video processing has been received, receiving a message asking whether to accept the request to perform video processing, and displaying the received message, wherein the message is generated by the first external apparatus; and
   transmitting the request to perform video processing to the second external apparatus if it is determined that the request to perform video processing through the displayed message is accepted.

4. The method as claimed in claim 1, wherein the transmitting of the data received through the network from the second external apparatus comprises, transmitting the received request to perform video processing to the first external apparatus if the request to perform video processing is received from the second external apparatus while the video received from the first external apparatus is being displayed.

5. The method as claimed in claim 1, wherein the first external apparatus comprises a host device which performs video processing for data received from the network display apparatus and outputs the processed video; and
   the second external apparatus comprises a server.

6. A network display apparatus comprising:
   a display which displays video received from a first external apparatus; and
   a controller which transmits data received through a network from a second external apparatus, to the first external apparatus for processing,
   wherein the data received from the second external apparatus includes a second video, the first external apparatus processes a first video of the first external apparatus and the second video data as a picture-in-picture (PIP) video to be transmitted to the network display apparatus, and the network display apparatus receives and displays the PIP video.

7. The apparatus as claimed in claim 6, wherein the controller transmits the received data to the first external apparatus if the data received from the second external apparatus comprises a request to perform video processing.

8. A network display apparatus comprising:
   a display which displays video received from a first external apparatus; and
   a controller which transmits data received through a network from a second external apparatus, to the first external apparatus for processing, wherein the controller transmits the received data to the first external apparatus if the data received from the second external apparatus comprises a request to perform video processing,
   wherein, if the request to perform video processing is received from the second external apparatus, the controller transmits to the first external apparatus an event indicating that the request to perform video processing has been received, receives a message asking whether to accept the request to perform video processing, and displays the received message on the display, wherein the message is generated by the first external apparatus; and the controller transmits the request to perform video processing to the second external apparatus if it is determined that the request to perform video processing through the displayed message is accepted.

9. The apparatus as claimed in claim 6, wherein, the controller transmits the received request to perform video processing to the first external apparatus if the request to perform video processing is received from the second external apparatus while the video received from the first external apparatus is being displayed.

10. The apparatus as claimed in claim 6, wherein the first external apparatus comprises a host device which performs video processing for data received from the network display apparatus and outputs the processed video; and the second external apparatus comprises a server.

11. A host device comprising:
a signal processor which performs video processing for data received through a network from a network display apparatus; and
a controller which:
generates a message asking whether to accept the data and displays the message on the network display apparatus, if an event to inform the controller that the data has been received from the network display apparatus through the network is received;
controls the signal processor to perform video processing for the data received from the network display apparatus, if an accept command is input through the displayed message; and
displays the processed video on the network display apparatus.

12. The device as claimed in claim 11, wherein the controller controls the signal processor to perform video processing for the received data and to display the processed video as picture-in-picture (PIP) video on the video displayed on the network display apparatus.

13. A network display system comprising:
a network display apparatus, which is connected to a network and has a thin client function; and
a host device connected to the network display apparatus, wherein,
the network display apparatus displays video received from the host device and transmits data received through the network to the host device; and
the host device performs video processing for the data received from the network display apparatus and displays the processed video as picture-in-picture (PIP) video on the video displayed on the network display apparatus,
wherein the data received from the network includes a second video, and the host device processes a first video of the host device and the second video data as PIP video to be transmitted to the network display apparatus for displaying.

14. The system as claimed in claim 13, wherein the network display apparatus transmits to the host device an event indicating that the request to perform video processing has been received, if the data received through the network comprises a request to perform video processing while the video received from the host device is displayed.

15. The system as claimed in claim 14, wherein the host device generates a message asking whether to accept the request and displays the message on the network display apparatus, if the event indicating that the request to perform video processing has been received, is received from the network display apparatus through the network; and the host device performs video processing for the data received from the network display apparatus, if a command to accept the request is received in response to the displayed message.

* * * * *